Feb. 18, 1958  R. D. SEAL ET AL  2,823,414
APPARATUS FOR RECOVERING THE MEATS OF BIVALVES
Filed Oct. 19, 1956  3 Sheets-Sheet 1
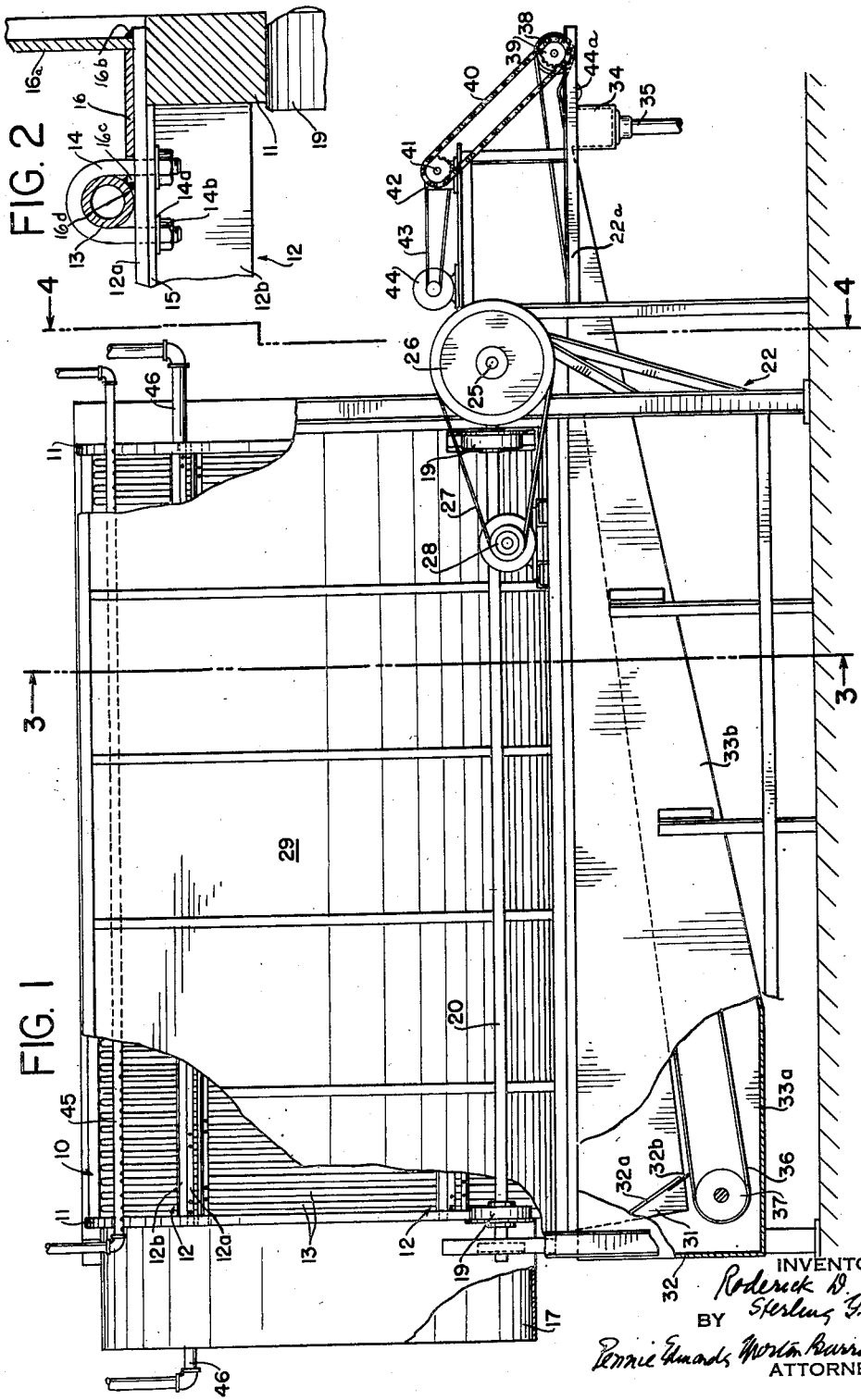
INVENTORS
Roderick D. Seal
Sterling G. Harris
BY
Pennie Edmonds Morton Barrows Taylor
ATTORNEYS Feb. 18, 1958  R. D. SEAL ET AL  2,823,414
APPARATUS FOR RECOVERING THE MEATS OF BIVALVES
Filed Oct. 19, 1956  3 Sheets-Sheet 2
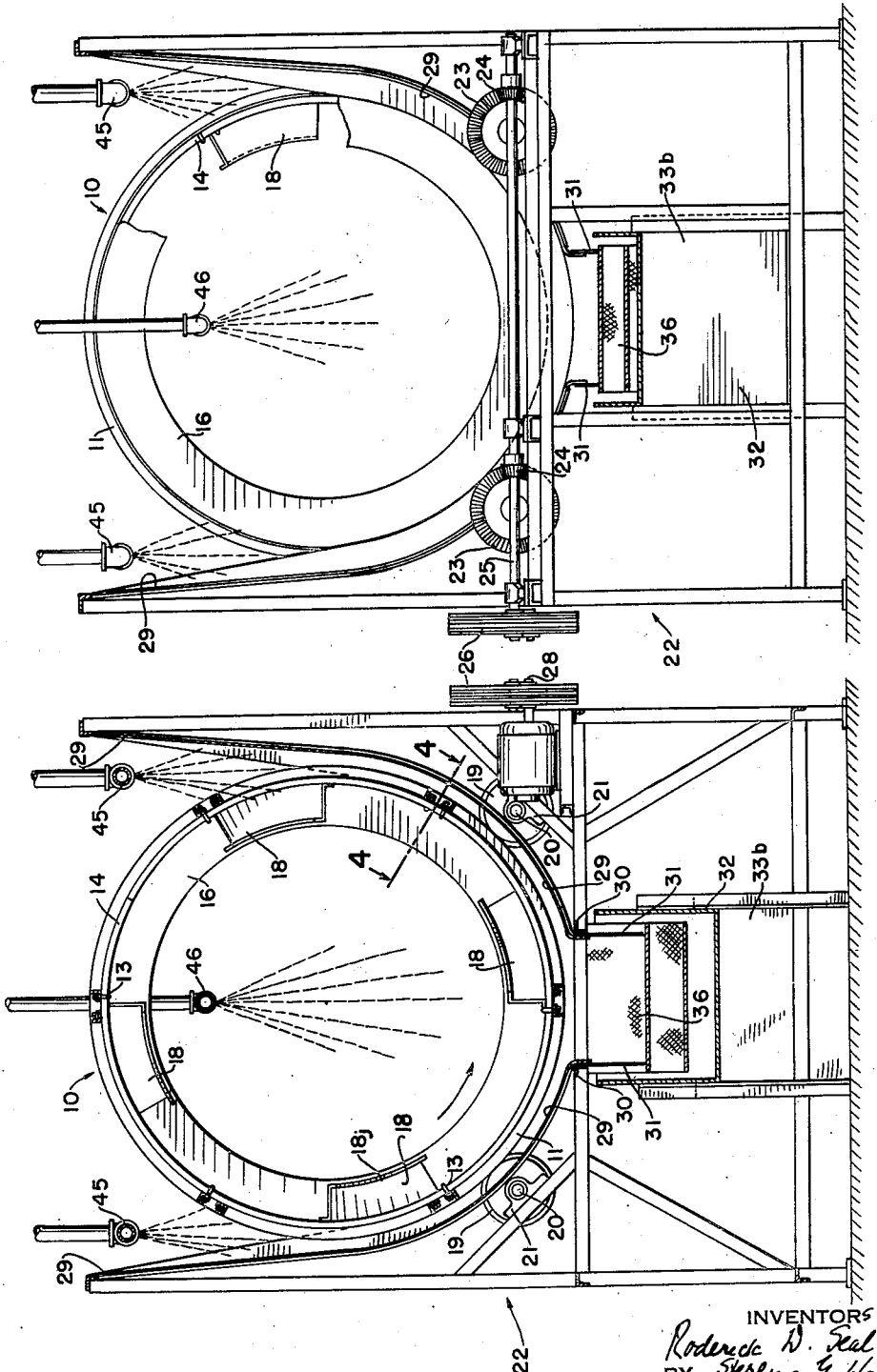

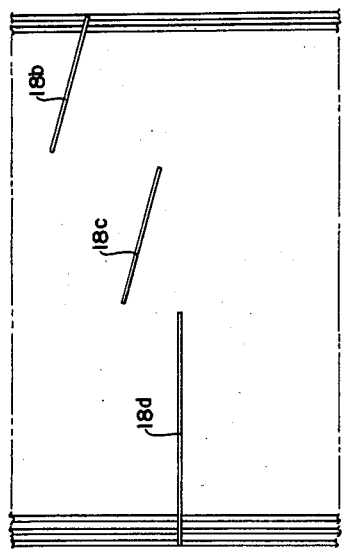
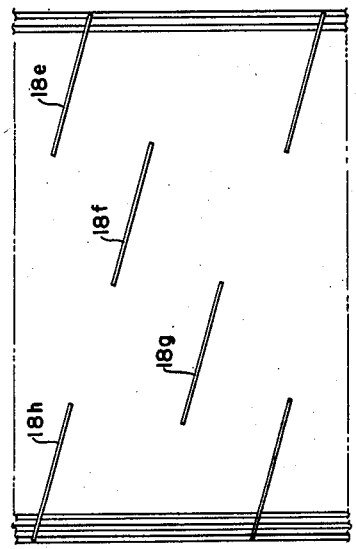
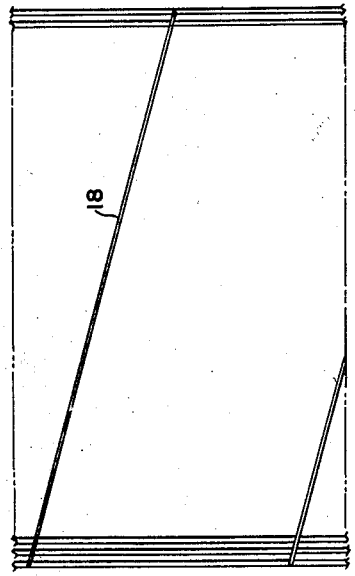
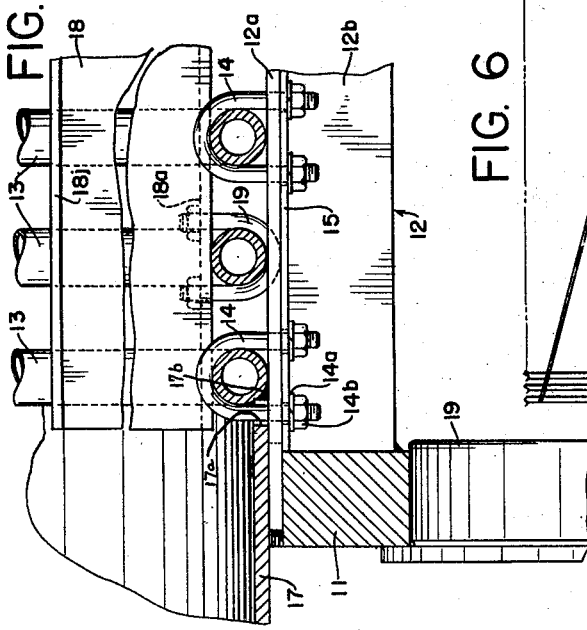

2,823,414
APPARATUS FOR RECOVERING THE MEATS OF BIVALVES

Roderick D. Seal, Golden Meadow, La., and Sterling G. Harris, Beaufort, S. C., assignors to The Blue Channel Corporation, Port Royal, S. C., a corporation of Maryland Application October 19, 1956, Serial No. 617,103

13 Claims. (Cl. 17—9)

This invention relates to the processing of edible bivalve mollusks exemplified by oysters, clams, mussels, and scallops as a preliminary to canning, freezing, or packaging for consumption without further treatment, and is concerned more particularly with a novel apparatus, by which the meats of processed bivalves can be recovered from their shells easily and with little damage thereto. While the apparatus of the invention may be used to operate on bivalves of all kinds, it affords special advantages in the recovery of oyster meats and a form of the apparatus suitable for that use will, accordingly, be illustrated and described for purposes of explanation.

The processing of oysters to recover the meats, as heretofore practiced, has customarily involved washing the oysters, when necessary, to remove foreign matter adherent to the shells, after which the oysters are steamed or cooked. For this purpose, the oysters may be loaded into crates, which are placed in retorts heated by steam, or the oysters may be placed in cars, which are moved into a steam box. The steaming of the oysters was originally for the primary purpose of causing the shells to open, so that the meats could be easily removed by hand, but, more recently, the cooking has been carefully controlled, so that the shells are opened and, in addition, the adherence of the adductor muscles of the oysters to the inner surfaces of the valves is weakened. The tenacity, with which the muscles adhere to the valves, differs in oysters grown in different localities, so that the controlled steaming of the oysters varies in duration and temperature within a considerable range determined by experience. At the conclusion of such a cooking operation properly carried on, the shells of the oysters are found to have opened and the attachment of the muscles to the valves is greatly weakened. The meats can then be recovered by manual operations or in a bulk treatment, as by tumbling in the apparatus of the Harris Patent 2,652,588, issued September 22, 1953.

Oysters from some localities have muscles which adhere strongly to the shells, and meats which are extremely tender and easily injured. After cooking, such oysters require a severe tumbling treatment in order to separate the meats from the shells and, in such treatment, the meats freed from the shells should be removed as rapidly as possible from the mass being tumbled in order to avoid damage to the meats. While the apparatus of the Harris patent can be so constructed as to subject the oysters to a tumbling treatment of the desired severity, the apparatus does not discharge the meats from the mass under treatment as rapidly as is desirable, and, as a result, damage to tender meats is likely to result.

The present apparatus is, accordingly, directed to the provision of a novel apparatus for the treatment in bulk of processed bivalve mollusks, which quickly causes the meats to be separated from the shells and then discharges the meats so rapidly from the mass undergoing treatment and collects the meats so gently that damage to the meats is avoided. The apparatus includes a drum of generally cylindrical form, which has a wall formed with substantially continuous circumferential openings of a width such as to pass the meats while holding back the major proportion of the shells. The openings are closely spaced lengthwise of the drum and, since they extend circumferentially, their effective size does not vary as the drum rotates. Within the drum are means for raising the shells and allowing them to fall and such means may be so constructed that the mollusks are advanced along the drum from the point, from which they were raised, and land on the drum wall rather than on other mollusks. The meats discharged through the drum openings drop upon the inner surface of a pan, which lies close to the drum wall and is continually kept wet, and then slide down the pan to pass through a discharge opening in the bottom of the pan, or else the meats fall directly through the pan opening. In either case, the meats leaving the pan enter a tank containing liquid and are removed from the tank by a traveling belt conveyor.

For a better understanding of the invention, reference may be made to the accompanying drawings, in which Fig. 1 is a view in side elevation with parts broken away of a form of the new apparatus, which may be used advantageously with oysters;

Fig. 2 is an enlarged fragmentary longitudinal sectional view showing the entrance end construction of the apparatus;

Figs. 3 and 4 are sectional views on the lines 3—3 and 4—4, respectively, of Fig. 1;

Fig. 5 is an enlarged view similar to Fig. 2 showing the exit end construction; and Figs. 6, 7, and 8 are developed diagrammatic views illustrating different arrangements of baffles employed in the apparatus.

The apparatus shown in Fig. 1 comprises a rotary drum 10, which is of generally cylindrical shape and has a wall formed with closely spaced substantially continuous circumferential openings. The drum preferably comprises a pair of traction rings or tires 11, which are connected by pairs of angle irons 12 forming longitudinal members or braces. To connect the members to the tires, the members are formed so that one flange 12a of each member projects beyond the other at the ends of the member and the projecting end sections of flange 12a extend into and are secured to the inner faces of the tires 11, while the ends of the other flange 12b of the member bear against the opposed lateral faces of the tires. The longitudinal members are disposed in pairs with the members of each pair lying relatively closely spaced and the flanges 12a of the members extending toward each other. The flange 12a of each member 12 is formed with a longitudinal channel extending substantially from one end of the flange to the other.

The wall of the drum between the tires 11 is formed by a plurality of curved members having their ends welded together to form ring 13, although, if desired, the ends of adjacent members can be secured together to form a helix extending from one tire to the other. The rings can be advantageously made of pipe and they are of a diameter to engage the inner faces of the flanges 12a of the longitudinal members. The odd rings along the drum are secured to one member of each pair of longitudinal members and the even rings are secured to the other member of each pair. For this purpose, a U-bolt 14 is placed to straddle each ring at one of the longitudinal members 12 of each pair and the ends of the bolt are passed through the channel in the flange 12a of the member. A flat spacer bar 15 having openings at the proper intervals is placed against the outer face of flange 12a and the ends of the bolt 14 are passed through openings in the spacer bar. Lock washers 14d are then placed on the ends of the bolts and nuts 14b are threaded on the bolts and drawn tight. The rings are spaced to form openings of a width, which will pass the meats of the oysters being treated and hold back the major proportion of the shells, and the spacing thus varies with different oysters. Also, the spacing between the rings may vary along the drum as, for example, it is preferable to provide a slightly wider spacing near the entrance end than near the discharge end. Thus, the rings 13 may be made of iron pipe of an inside diameter of ½" and may be spaced ⅝" through the first third of the length of the drum starting at the entrance end and ½" through the remainder of the drum.

At the entrance end, the drum is provided with an entrance plate made up of a sleeve 16 and a flat annular member 16a. The sleeve lies against and is secured by welding 16b to the inner faces of the end sections of the flanges 12a of the longitudinal members, which lie within the tire 11 at one end of the drum. The sleeve may be provided at its inner edge with notches 16c to receive one leg of each of the U-bolts 14 holding the end ring 13 in place and the inner end edge of the sleeve may be secured to the ring by welding 16d. The member lies in contact with and is secured to the outer edge of sleeve 15. The member 16a provides the drum with an internal flange, which prevents oysters fed into the drum from falling out the entrance end.

At the exit end, the drum is provided with a discharge plate 17, which is of cylindrical form and is telescoped within and secured to the end sections of the flanges 12ᵃ of the longitudinal members lying within the tire 11. The inner edge of the discharge plate may have notches 17a receiving the legs of the U-bolts holding the adjacent ring 13 in place and the plate may be secured to the ring by welding 17b.

A plurality of baffles 18 are mounted within the drum for raising the oysters and allowing them to fall as the drum rotates. The baffles are formed of metal plates having lateral flanges 18a at one end and the baffles are secured in place with their flanges lying against the inner surfaces of the rings 13 by U-bolts 19 straddling the rings and having their ends passing through openings in the flanges. The baffles may extend continuously from end to end of the group of rings and preferably lie at an angle of about 30° to the drum axis. If preferred, the baffles may be made in a plurality of sets as shown in Figs. 7 and 8.

In the arrangement illustrated in Figs. 7, the baffle 18b is one of a set disposed at the entrance end of the drum and the baffle 18c is one of a similar set lying inward from the set of baffles 18b with the baffles of the two sets staggered. The baffles 18b and 18c lie at an angle to the drum axis of, for example, 30°. Along the drum beyond the baffles 18c, there is a set of baffles 18d, which extend to the discharge end of the group of rings and lie parallel to the drum axis. The number of baffles in each set varies with the diameter of the drum and, in a drum, in which the outer diameter of the rings is 6', there may be six baffles in each set. In the construction shown in Fig. 8, there are four sets of baffles typified by those marked 18e, 18f, 18g and 18h. The baffles of adjacent sets are staggered and baffles 18e and 18f overlap slightly as do baffles 18g and 18h. The baffles of all the sets lie at an angle to the axis of the drum.

In the rotation of the drum, the baffles raise the oysters fed into the drum as the drum rotates and, when the baffles have risen sufficiently, the oysters fall from the baffles to the bottom of the drum. By mounting the baffles to lie at an angle to the drum axis, the oysters are advanced along the drum each time they are lifted and dropped and the oysters land upon the rings 13 of the drum instead of on other oysters. The shocks, to which the oysters are subjected as they are raised and dropped, release the meats from the shells and most of the meats are so released in the part of the drum adjacent the entrance end. In order to increase the severity of such shocks, the baffles may be provided along their free inner edges with lateral flanges 18j, which serve to retain the oysters on the baffles and thus cause the oysters to be raised to a greater height before discharge.

The drum is mounted for rotation with its tires 13 resting upon pairs of wheels 19, which engage the tires from beneath and lie at opposite sides of a vertical plane through the drum axis. The wheels of each pair are mounted on a shaft 20 supported in bearings 21 attached to members of a supporting framework 22 and the shafts are provided at the entrance end of the drum with beveled gears 23 driven by pinions 24 on a cross shaft 25 mounted in bearings on the framework. The shaft 25 carries a multiple pulley 26, which is driven through a plurality of belts 27 by a motor 28 mounted on the framework.

A collecting pan of sheet metal is mounted on the framework 22 to extend along the sides and bottom of the drum and the pan is illustrated as made up of a pair of members 29 attached to the top of the framework and extending downward to frame members 30 spaced apart and extending lengthwise of the drum beneath it. The tops of the members lie above the level of the top of the drum and, from about a horizontal plane through the drum axis, the members forming the pan are curved to conform with the curvature of the drum and lie close to its outer surface. A pair of rubber aprons 31 are attached to the lower ends of the pan members and extend downwardly into a water tank 32, which is supported on the framework and extends from the discharge end of the drum past the free end. Adjacent the discharge end of the drum, the bottom of the tank has a section 33a, which is horizontal, while the remainder 33b of the bottom extends upward at an angle to an overflow channel 34. A pipe 35 leads from the channel to a discharge point, although, if preferred, the water issuing from the pipe may be recirculated. A conveyor belt 36, which is preferably made of wire mesh, is trained about drum 37 lying near the bottom of the tank below the discharge end of the drum and the belt is trained about another drum 38 mounted on an extension 22a of the framework and having a sprocket wheel 39 connected by a chain 40 to a sprocket wheel 41 on the shaft of a gear reducer 42. The gear reducer is driven through a belt 43 by a motor 44 and the motor and gear reducer are mounted on the framework extension. An idler roller 44a is mounted on the framework to engage the belt 36 and keep it taut. A plate 32a with a rubber scraper blade 32b is preferably mounted at the deep end of the tank in such manner that the blade will bear upon the belt and keep it clean.

The inner surface of the pan is continually kept moist, so that oyster meats falling thereon will slide freely down the pan and drop into the water in tank 32. For this purpose, a pair of water pipes 45 having bottom openings may be mounted on opposite sides of the drum within the pan to extend lengthwise of the drum and discharge water on the surface of the pan. Preferably, another water pipe 46 with discharge openings is mounted within the drum near the upper part thereof and discharges water upon the contents of the drum. Instead of using the three pipes described, the pipe 46 may be used alone, in which event, the openings in the pipe are so formed that jets of water will be directed toward the inner surfaces of the pan at about the places where the pan begins to curve beneath the drum. In an alternative construction, the pipe 46 is not used and the pipes 45 are preferably formed with openings causing jets of water to be directed into the drum.

In the use of the apparatus described in the treatment of oysters, for example, the oysters are preliminarily processed by cooking and are then fed into the rotating drum past the flange 16 of the entrance plate. As the drum rotates, the oysters are raised by the baffles and allowed to fall and, in this tumbling action, the meats are released from the shells and are discharged through the openings between adjacent rings 13, while substantially all the shells except very small shells and shell pieces are held back. The shock resulting from the first fall of the oysters ordinarily does not release all the meats, although the meats are freed from the major portion of the shells by the first impact. The raising and dropping of the oysters is, accordingly, continued and by the time the shells reach the end of the group of rings and pass out of the drum over the discharge plate, the meats from substantially all the shells have been recovered.

In order to prevent meats released from their shells from being cut or otherwise damaged by the shells in the tumbling mass within the drum, it is important that the meats be discharged from the drum as soon as possible after their release. The construction of the drum wall with substantially continuous circumferential openings facilitates the discharge of the meats from the tumbling mass, since these openings are always of full effective size. In the drum of the Harris patent, the drum wall is formed of longitudinal members spaced to provide discharge openings between them, but each such opening permits unobstructed discharge of the meats only when the opening is in the vertical plane through the drum axis. On opposite sides of that plane, one or the other of the members defining the opening lies in such position as to impede the movement of the meats through the opening to some extent and, as a result, when oysters with tender meats are treated in the apparatus of the patent, some of the meats are not discharged sufficiently rapidly from the drum to avoid damage.

The meats leaving the drum either drop on the inner surface of the pan and are washed down through the opening between the aprons 31 or the meats fall directly through the opening. In either case, the meats drop into the water in the tank 32 and settle gently through the tank to come to rest upon the surface of belt 36. The belt conveys the meats thereon upwardly and discharges them as it passes over the drum 38. The provision of the water tank permits the fall of the meats to be cushioned, so that damage to the meats is prevented.

We claim:

1. Apparatus for recovering the meats from the shells of bivalve mollusks, which comprises a supporting structure, a plurality of wheels mounted for rotation in fixed bearings on the structure, a cylindrical drum having a wall formed with closely spaced substantially continuous openings, said openings being axially spaced and extending circumferentially about the drum and being of a width to pass the meats and hold back the shells, the drum having a pair of circumferential tires resting on the wheels to support the drum for rotation, with its axis approximately horizontal, driving means connected to at least one of the wheels and operable to rotate the wheel and the drum, a pan mounted on the structure and enclosing the lower part of the drum to receive meats escaping from the drum, the pan having a bottom discharge opening, means mounted on and lying within the drum for raising the shells and allowing them to fall as the drum rotates, and means for wetting the inner surface of the pan to prevent sticking of the meats thereto, whereby the openings throughout the lower half of the drum are unrestricted for the free passage of the meats by gravity.

2. The apparatus of claim 1, in which the tires are connected by a plurality of angularly spaced longitudinal members and a plurality of rings mounted on the longitudinal members form the drum wall and are longitudinally spaced to define the openings.

3. The apparatus of claim 2, in which the drum has a sheet metal section attached to the longitudinal members and extending beyond the rings at the discharge end.

4. The apparatus of claim 2, in which the rings are secured to the longitudinal members by U-bolts adjustably attached to the members.

5. The apparatus of claim 1, in which the means within the drum for raising the shells and allowing them to fall are baffles secured to the drum wall and extending inward therefrom, at least some of the baffles being operative to advance the shells toward the discharge end of the drum.

6. The apparatus of claim 5, in which the baffles are shorter than the length of the drum and are arranged in circumferential sets with the baffles in adjacent sets in staggered relation.

7. The apparatus of claim 5, in which the baffles extend substantially from one end to the other of the drum.

8. The apparatus of claim 5, in which at least some of the baffles are formed with lateral retaining members.

9. The apparatus of claim 1, in which the lower part of the pan is curved to conform to the curvature of the drum.

10. The apparatus of claim 1, in which the pan opening extends substantially the full length of the drum and a tank containing liquid is mounted on the structure beneath the openings to receive meats discharged through the opening.

11. The apparatus of claim 10, in which a traveling belt is mounted in the tank and operates to remove meats entering the liquid in the tank.

12. The apparatus of claim 1, in which the means for wetting the inner surface of the pan includes at least one spray pipe discharging upon the pan.

13. The apparatus of claim 12, which includes a spray pipe within the drum discharging liquid upon the shells therein and a pair of spray pipes outside the drum discharging upon the inner surface of the pan.

References Cited in the file of this patent

UNITED STATES PATENTS

| | | |
|---|---|---|
| 1,383,162 | Sprague | June 28, 1921 |
| 2,574,044 | Lapeyre et al. | Nov. 6, 1951 |
| 2,652,588 | Harris | Sept. 22, 1953 |

FOREIGN PATENTS

| | | |
|---|---|---|
| 601,692 | France | Dec. 10, 1925 |
| 643,383 | France | July 2, 1929 |